United States Patent [19]

Weaver

[11] Patent Number: 5,002,452
[45] Date of Patent: Mar. 26, 1991

[54] QUICK RELEASE SPARE TIRE CARRIER

[76] Inventor: William J. Weaver, 299 48th Ave., Zeeland, Mich. 49464

[21] Appl. No.: 451,650

[22] Filed: Dec. 18, 1989

[51] Int. Cl.$^5$ ............................................. B62D 43/00
[52] U.S. Cl. .................................... 414/466; 414/463; 224/42.23
[58] Field of Search ................ 414/462, 463, 464, 465, 414/466, 673; 224/42.12, 42.21, 42.23, 42.24, 42.26, 42.27, 42.28; 188/319

[56] References Cited

U.S. PATENT DOCUMENTS

| | | | |
|---|---|---|---|
| 2,679,961 | 6/1954 | Brewer | 414/466 |
| 3,223,263 | 12/1965 | Fielding | 414/466 |
| 3,428,200 | 2/1969 | Graves et al. | 414/466 |
| 3,494,493 | 2/1970 | Fowler | 414/466 |
| 3,547,289 | 12/1970 | Steele | 414/463 |
| 3,735,883 | 5/1973 | Hrivnyak | 414/466 |
| 4,060,171 | 11/1977 | Ludwig . | |
| 4,264,260 | 4/1981 | Kralcon . | |
| 4,329,107 | 5/1982 | Smith . | |
| 4,384,815 | 5/1983 | Suzuki et al. . | |
| 4,537,555 | 8/1985 | Combs . | |

Primary Examiner—Frank E. Werner
Assistant Examiner—James T. Eller
Attorney, Agent, or Firm—Leon Gilden

[57] ABSTRACT

An apparatus is set forth wherein a central, elongate support bar includes a rear pivot pin mounted to a cross frame that is in turn integrally mounted between spaced frame rails of an associated truck. The support bar includes a through-extending aperture adjacent its forwardmost end to receive a pin, wherein the pin is integrally secured to a lower rear flange of the rear bumper of the vehicle. Upon release of the bar relative to the pin, the bar is pivoted downwardly to release the tire slidingly towards an individual subsequent to its being sandwiched between the bar and bottom surface of the truck bed. A modification of the instant invention includes the tire mounted upon a slide to securely maintain the tire in its downwardly sliding position relative to the support bar, and may further include an air cylinder to dampen dropping of the bar upon release relative to the pin.

2 Claims, 4 Drawing Sheets

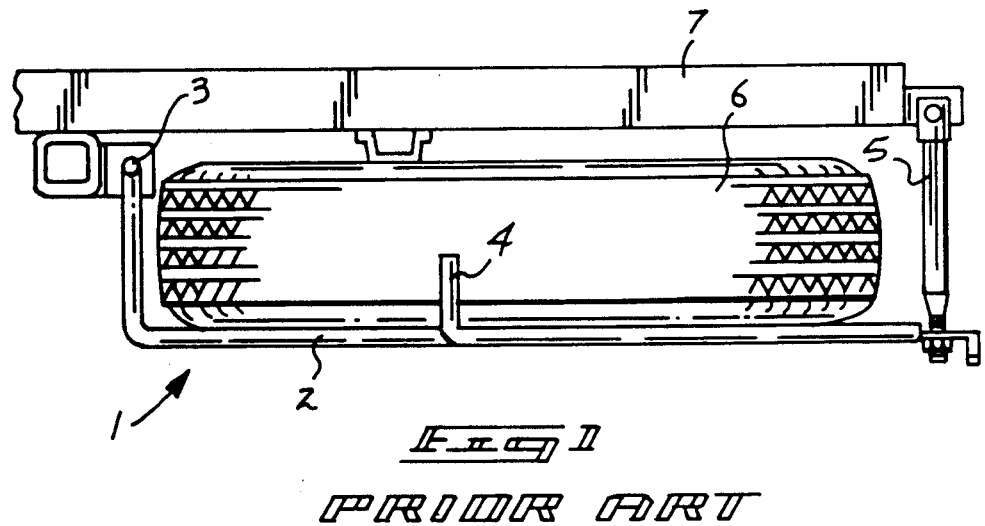
Fig 1
PRIOR ART
Fig 2
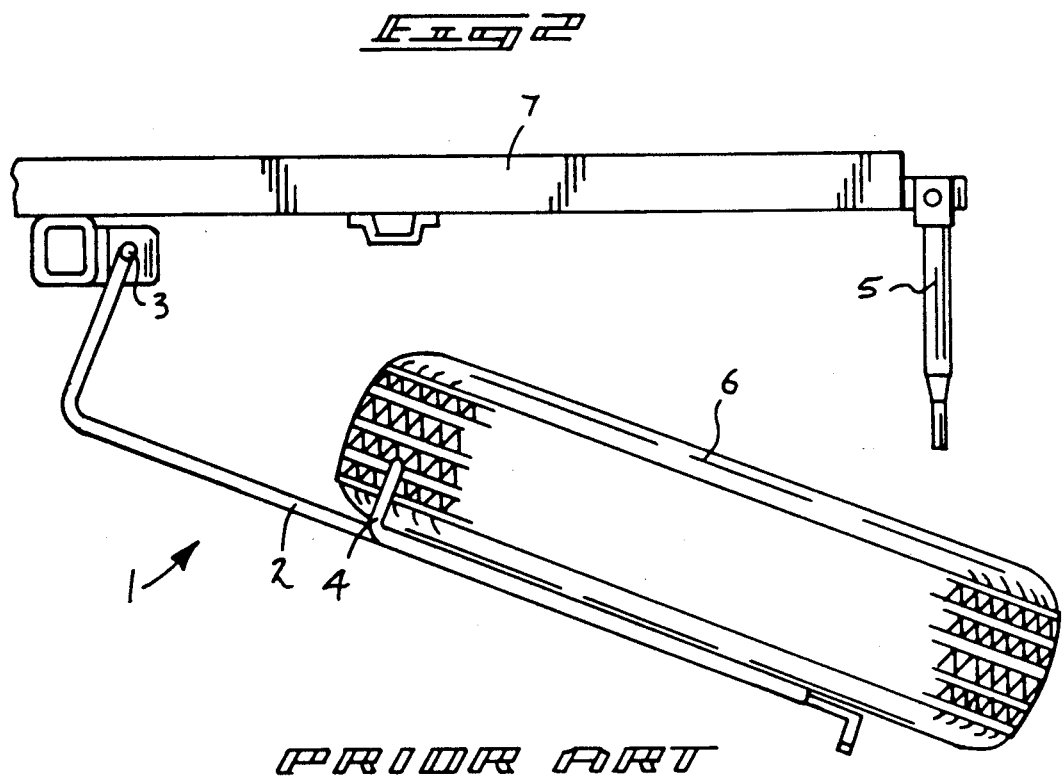
PRIOR ART

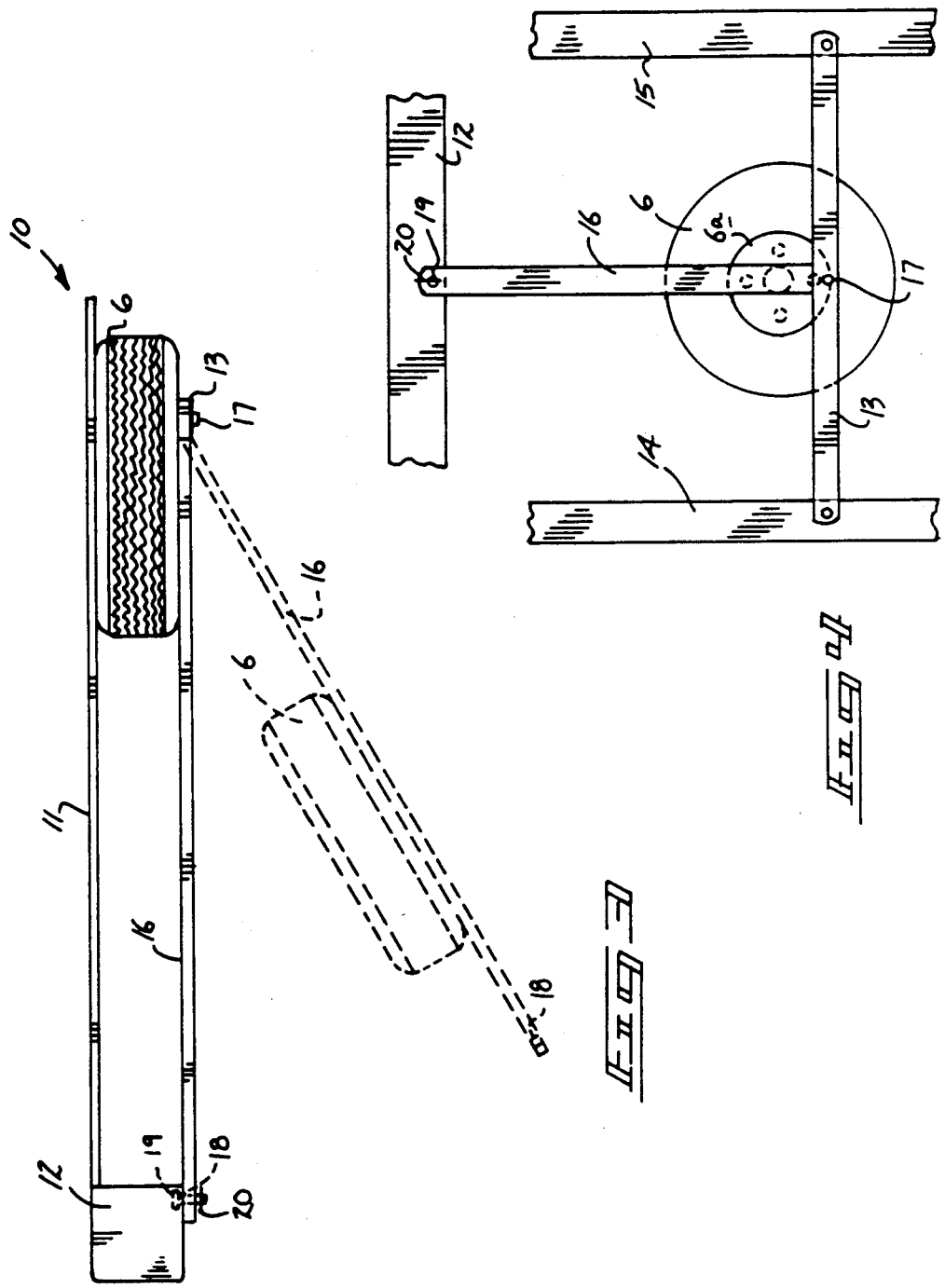

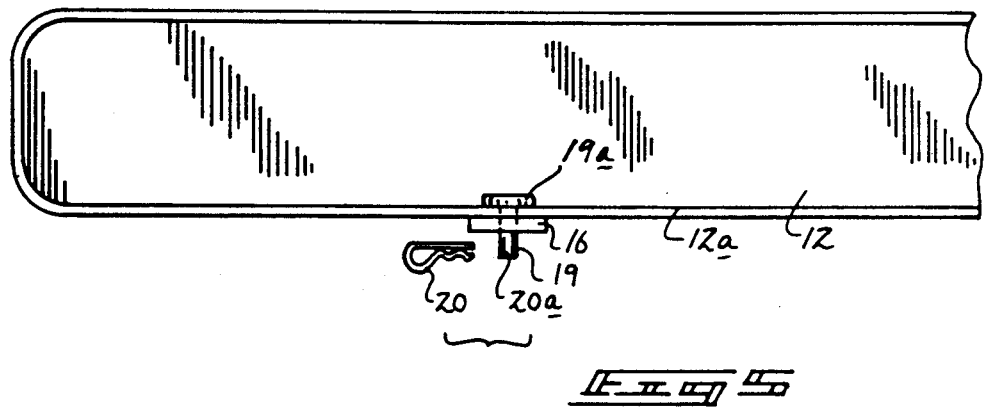
FIG 5
FIG 6
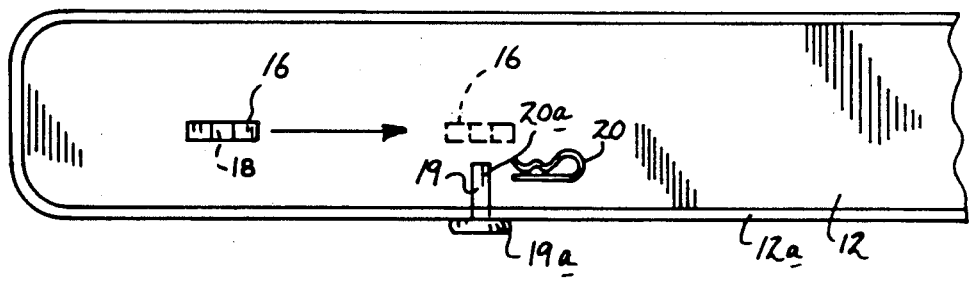

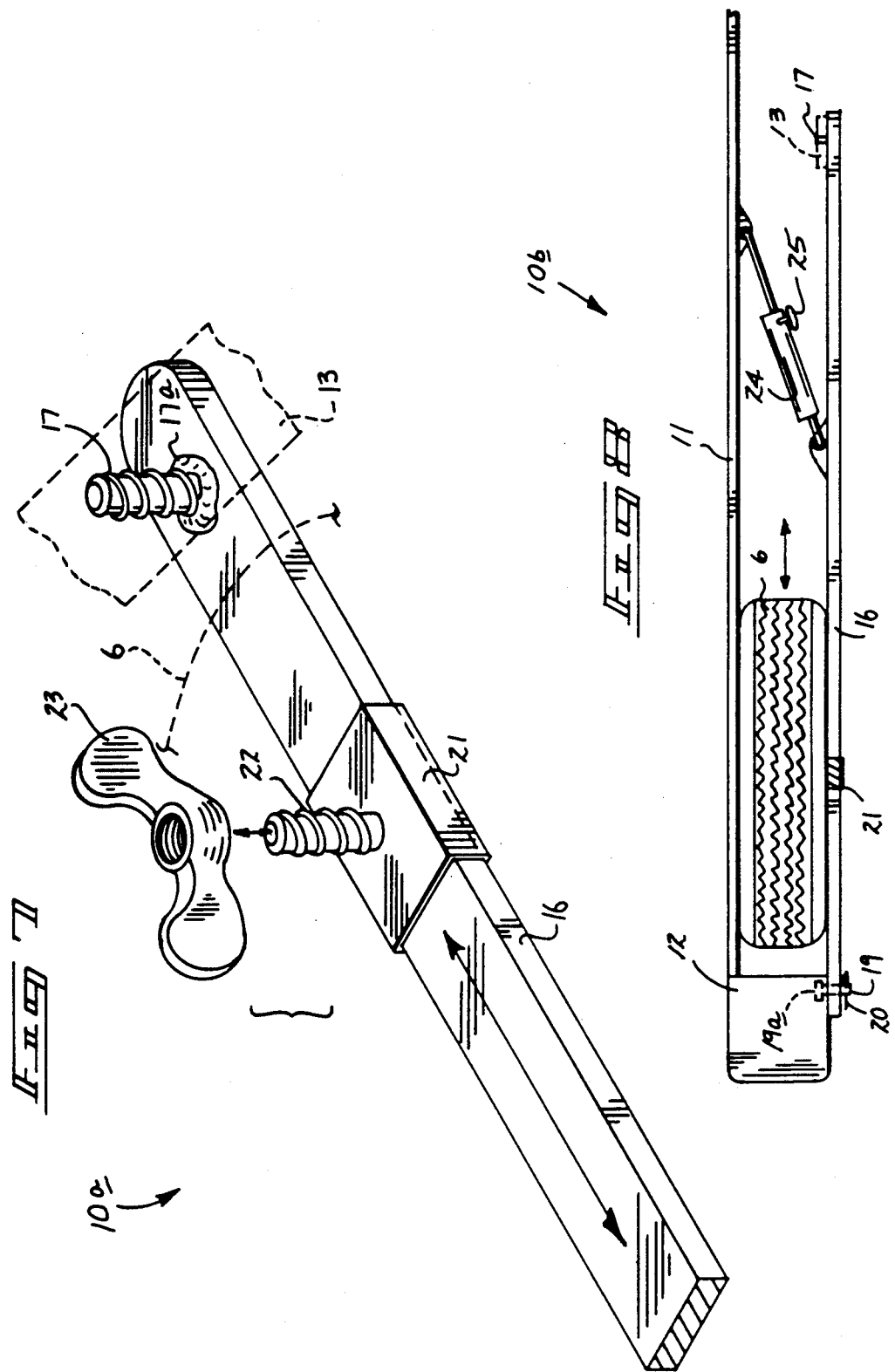

QUICK RELEASE SPARE TIRE CARRIER

BACKGROUND OF THE INVENTION

1. Field of the Invention

The field of invention relates to quick release tire carries, and more particularly pertains to a quick release spare tire carrier particularly for use with pickup truck beds.

2. Description of the Prior Art

Trucks, and particularly pickup style trucks, have conventionally found spare tire placement awkward. Such placement is normally positioned to an underside of the pickup bed in an effort to provide maximum use of the bed for storage, hauling and the like. There have, in the prior art, been many efforts to provide a convenient and effective means of storing a spare tire under the associated truck bed. For example, U.S. Pat. No. 4,384,815 to Suzuki, et al., sets forth a spare tire hanger provided with an "L" shaped tubular framework that includes central pins to secure a tire thereto, wherein the "L" shaped framework is mounted to a pivotal support pin that is removable upon a wheel wrench or the like to utilize disengagement of the carrier relative to the pin.

U.S. Pat. No. 4,060,171 to Ludwig sets forth a pivotally mounted support bar wherein an over-center clamp latch secures the bar to a rear bumper of the vehicle.

U.S. Pat. No. 4,329,107 to Smith sets forth a vehicular spare tire carrier wherein a levering arrangement utilizing a pulley and tether is mounted to raise and lower the support structure of the tire relative to the pickup truck bed.

U.S. Pat. No. 4,537,555 to Combs sets forth a vehicular undercarriage spare tire carrier wherein a pulley assembly secured to the rear bumper of the vehicle is operative through a lever to raise and lower the associated spare tire support structure relative to the vehicle.

U.S. Pat. No. 4,264,260 to Krakow wherein the carrier comprises an elongate support beam mounted to the vehicle in a manner parallel to the rear wheel axis, wherein a cradle frame is suspended from a support beam in a manner such that it may be pivoted downwardly and rotated rearwardly of the vehicle for the removal of a spare tire therefrom.

As such, it may be appreciated that there is a continuing need for a new and improved quick release spare tire carrier which addresses the problems of simplicity of construction to permit ease of use and effectiveness in its operation and in this respect, the present invention substantially fulfills this need.

SUMMARY OF THE INVENTION

In view of the foregoing disadvantages inherent in the known types of spare tire carrier constructions now present in the prior art, the present invention provides a quick release spare tire carrier wherein the same includes a single pivoted beam mounted to a framework of an associated vehicle to permit ease of release and descent of a spare tire supported thereto. As such, the general purpose of the present invention, which will be described subsequently in greater detail, is to provide a new and improved quick release spare tire carrier which has all the advantages of the prior art spare tire support structures and none of the disadvantages.

To attain this, the present invention includes an apparatus wherein a central, elongate support bar includes a rear pivot pin mounted to a cross frame that is in turn integrally mounted between spaced frame rails of an associated truck. The support bar includes a through-extending aperture adjacent at its forwardmost end to receive a pin, wherein the pin is integrally secured to a lower rear flange of the rear bumper of the vehicle. Upon release of the bar relative to the pin, the bar is pivoted downwardly to release the tire slidingly towards an individual subsequent to its being sandwiched between the bar and bottom surface of the truck bed. A modification of the instant invention includes the tire mounted upon a slide to securely maintain the tire in its downwardly sliding position relative to the support bar, and may further include an air cylinder to dampen dropping of the bar upon release relative to the pin.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved quick release spare tire carrier which has all the advantages of the prior art spare tire carrier constructions and none of the disadvantages.

It is another object of the present invention to provide a new and improved quick release spare tire carrier which may be easily and efficiently manufactured and marketed.

It is a further object of the present invention to provide a new and improved quick release spare tire carrier which is of a durable and reliable construction.

An even further object of the present invention is to provide a new and improved quick release spare tire carrier which is susceptible of a low cost of manufacture with regard to both materials and labor, and which accordingly is then susceptible of low prices of sale to the consuming public, thereby making such quick release spare tire carriers economically available to the buying public.

Still yet another object of the present invention is to provide a new and improved quick release spare tire carrier which provides in the apparatuses and methods of the prior art some of the advantages thereof, while simultaneously overcoming some of the disadvantages normally associated therewith.

Still another object of the present invention is to provide a new and improved quick release spare tire carrier wherein the same is secured and sandwiched between the carrier and an associated pickup truck bed and readily dropped for access to the tire in use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic side view taken in elevation of a prior art spare tire carrier in a secured position.

FIG. 2 is an orthographic side view of a spare tire carrier, as illustrated in FIG. 1, in a lowered position.

FIG. 3 is an orthographic side view taken in elevation of the instant invention.

FIG. 4 is an orthographic bottom view of the spare tire carrier in association with the framework of an associated truck body.

FIG. 5 is an orthographic view of the securement pin organization of the instant invention.

FIG. 6 is an orthographic view taken in elevation of a modified securement pin organization utilized by the instant invention.

FIG. 7 is an isometric illustration of a modified spare tire carrier organization of the instant invention.

FIG. 8 is an orthographic side view taken in elevation of a further modified spare tire support carrier of the instant invention.

DESCRIPTION OF THE PREFERRED EMBODIMENT

With reference now to the drawings, and in particular to FIGS. 1 to 8 thereof, a new and improved quick release spare tire carrier embodying the principles and concepts of the present invention and generally designated by the reference numerals 10, 10a, and 10b will be described.

FIGS. 1 and 2 are illustrative of a prior art spare tire carrier 1 wherein a generally "L" shaped framework 2 is pivotally mounted at a remote end 3 to a vehicular framework, and wherein the spare tire carrier includes alignment members 4 to secure the tire to the support structure. The "L" shaped carrier typically includes a forward end that is formed to receive a pivoted latch bolt 5 to secure the spare tire carrier 6 between the spare tire carrier framework and the truck framework 7.

More specifically, the quick release spare tire carrier 10 of the instant invention essentially comprises securement of a spare tire 6 in a sandwiched relationship between the bottom surface of a truck bed 11 and the spare tire carrier 10. The carrier 10 includes an elongate support bar 16 formed with a rear pivot pin 17 that pivotally mounts a rear terminal of the support bar 16 to a cross brace 13. The cross brace 13 is orthogonally and fixedly mounted between spaced first and second truck frame rails 14 and 15 respectively. The pivot pin 17 is pivotally mounted medially of the cross brace 13 at its rear end and includes a forward securement aperture 18 orthogonally formed adjacent a forward end of the bar 16 to receive a support rod 19 therethrough. The support rod 19 is mounted to the rear truck bumper 12, and more specifically to a bottom flange 12a of the rear bumper 12. The support rod 19 includes an enlarged head 19a that is fixedly secured to the flange 12a wherein, as illustrated in FIGS. 5 and 6, the rod 19 may be directed upwardly or downwardly through the flange 12a. The rod 19 includes a latch pin 20 that is slidably received within a latch pin aperture 20a. Upon removal of the latch pin 20, the support bar 16 is removed from the shank of the support rod 19 and pivoted away from the bumper 12, wherein the spare tire 6 is slid downwardly, as illustrated in FIG. 3, in the direction of the rear bumper 12 for replacement and use thereof.

FIGS. 7 and 8 illustrate a modified quick release spare tire carrier 10a and 10b respectively wherein the first modification 10a includes a slide 21 of generally rectangular cross-sectional configuration defining a rectangular interior complementary to that of an external configuration defined by the support bar 16 to maintain alignment of the slide 21 on the bar 16 in use. A threaded wheel bolt 22 extends medially and orthogonally from an upper surface of the slot 21 to be directed through an aperture of the central support hub 6a of the tire 6 to ensure the positioning and alignment of the tire 6 on the slide 21. The rear pivot pin 17 includes a ball and socket 17a to enable pivotment of the pin 17 relative to the cross brace 13.

FIG. 8 utilizes the advantages of the modifications, as illustrated in FIG. 7, further including a slow release air cylinder 24 mounted at its lower end to the bar 16 adjacent the pivot pin 17 at the rear end of the bar 16, with the upper end of the slow release air cylinder 24 mounted to the lower surface of the truck bed 11 to prevent dropping of the bar 16 and associated tire onto an individual upon removal of the latch pin 20. An air cylinder pressure release valve 25 is provided within the air cylinder 24 to prevent pressure buildup upon returning of the bar 16 to its secure position, as illustrated in FIG. 8, whereupon the valve 16 is then re-tightened to provide the slow rate of descent of the bar 16 in a subsequent use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A spare tire carrier apparatus for securement of a spare tire to a bottom surface of a vehicular body, wherein the body includes a longitudinally aligned bed member, wherein the bed member includes a rear bumper orthogonally oriented to a rear end portion of the bed member, and spaced first and second frame rails underlying the vehicular body orthogonally oriented relative to the rear bumper mounting the rear bumper thereto, the apparatus including, and elongate support bar, the support bar including a rear pivot pin mounted to the support bar adjacent a rear end thereof, a forward support aperture orthogonally formed through the support bar adjacent a forward end of the support bar, a cross brace including a first end and a second end fixedly mounted at its respective first and second ends to the respective first and second frame rails, said rear rear pivot pin also being mounted to the cross brace, said bumper including a release means for selective securement through the forward support aperture to selectively secure the forward end of the support bar to the rear bumper, wherein the cross brace is spaced from the rear bumper a predetermined distance, and the pivot pin and the forward support aperture are spaced said predetermined distance along the support bar, and wherein the release means includes a suport rod orthogonally mounted through the bumper coaxially aligned with the forward support aperture when the support rod is positioned through the forward support aperture, and the support rod including an enlarged head fixedly mounted to the bumper, and the support rod further including a through-extending pin aperture, and a latch pin slidably mounted through the pin aperture to secure the support bar to the support rod, and wherein the said pivot pin is mounted to the support bar by a ball and socket structure, and further including a slide member slidably and surroundingly encompassing the support bar defining a through-extending bore defining a rectangular cross-sectional configuration, and the support bar defining an external cross-sectional configuration complementary to that defined by the bore defined by the slide, and wherein the slide further includes a threaded bolt orthogonally and integrally mounted to a top surface of the slide to accommodate the spare tire thereon and secure the spare tire to the slide, and a threaded nut member securable to the threaded bolt to enhance securement of the spare tire to the slide, and further including an air cylinder, wherein the air cylinder includes a lowermost end secured to the support bar adjacent the pivot pin and an upper end secured to a bottom surface portion of the vehicular body, wherein the air cylinder dampens and prevents free-fall of the cross bar when the latch pin is removed from the support rod.

2. An apparatus as set forth in claim 1 further including a manually operative valve formed to the air cylinder to selectively release pressure from the air cylinder to prevent dampening of the air cylinder when raising the support bar in a secured relationship relative to the bumper.

* * * * *